INVENTOR
CLARKE C. SYKES

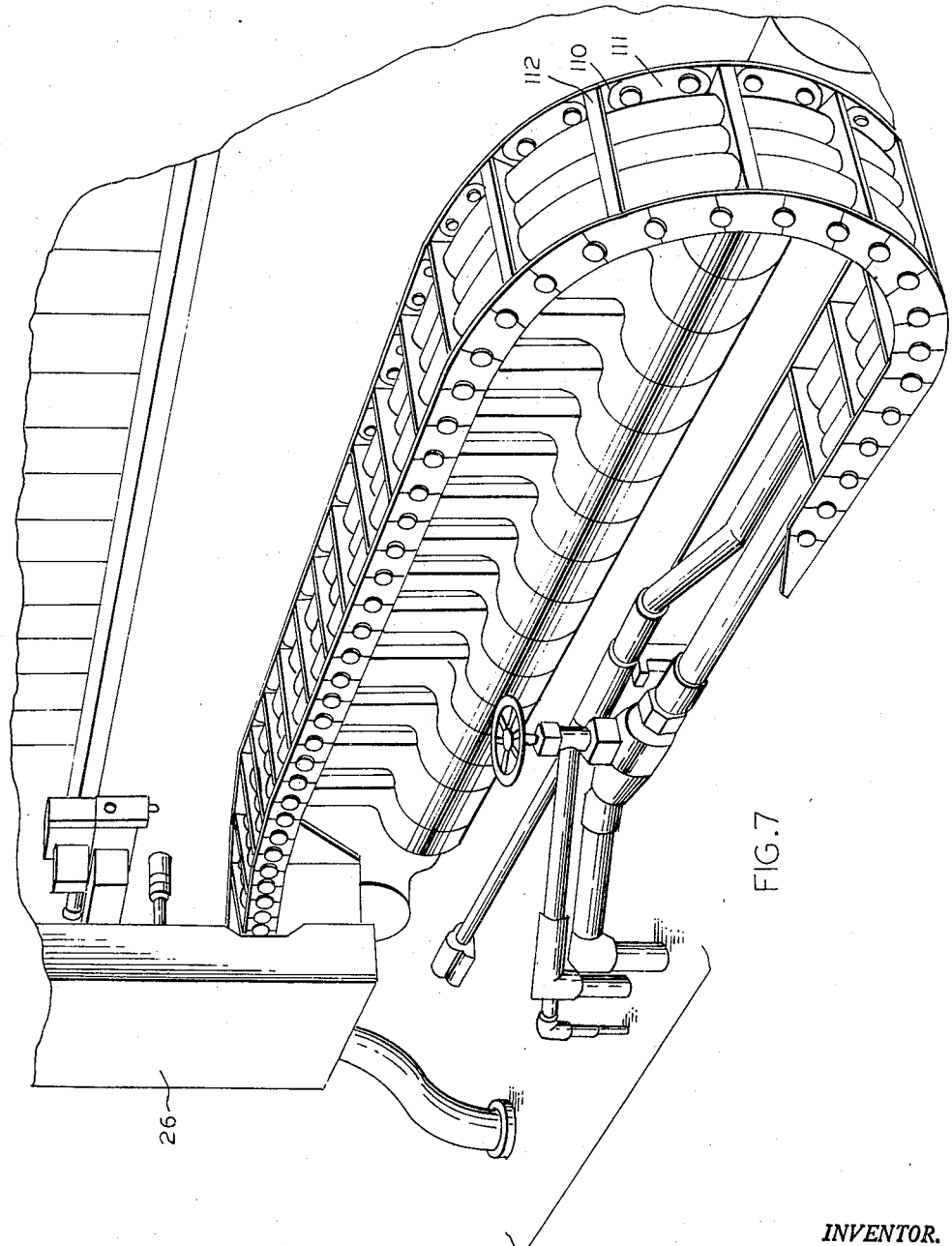

United States Patent Office 3,486,624
Patented Dec. 30, 1969

3,486,624
WASHING APPARATUS FOR WASHING THE FILTER CLOTHS IN A FILTER PRESS
Clarke C. Sykes, Toledo, Ohio, assignor to The F & M Schaefer Brewing Co., Brooklyn, N.Y., a corporation of New York
Filed Aug. 22, 1967, Ser. No. 662,474
Int. Cl. B01d 25/34, 25/12
U.S. Cl. 210—225        16 Claims

ABSTRACT OF THE DISCLOSURE

Filter press washing apparatus comprises a gantry movable along the filter press and having gantry drive means coupled to the gantry for driving the gantry. A spray head frame is mounted on the gantry for reciprocal up and down movement and has a spray head frame with a spray head thereon having nozzles thereon directed transversely of the spray head, and spray head frame driving means is provided for driving the spray head frame up and down, and washing liquid supply means is coupled to the spray head for supplying washing liquid to the nozzles. Plate pulling means is provided on the gantry which are engageable with the individual plates of the filter press for pulling the plates one at a time away from the stack of plates and frames and positioning them under the spray head frame, and plate and frame stacking means are provided on the gantry engageable with the individual frames of the filter press for stacking each washed plate and the frame immediately following the washed plate in the stack in a location on the opposite side of the gantry from the unwashed plates, and actuating means is provided for the plate pulling means and the plate and frame stacking means. The gantry driving means, the spray head frame driving means, the washing liquid supply means and the actuating means for the plate pulling means and the plate and frame stacking means are coupled together to cause the parts to operate in the desired sequence for pulling a plate away from the stack, reciprocating the spray head frame for washing the filter cloth, and then stacking the washed plate and the next frame on the other side of the gantry.

---

This invention relates to a washing apparatus for washing the filter cloths in a filter press.

During the normal operation of a filter press, the solids filtered out of the mixed solids and liquid are collected on the filter cloths which are held between the plates and frames of the press. One technique of removing these solids, either to recover them or simply to clean the filter cloths is to backwash the press. However, when large amounts of solids are filtered out, or when the press is large and the backwash system would be too large and expensive, or it is desired to recover the solids largely freed of any liquid, it is the more common practice to separate the frames and plates and physically remove the solids. In the manufacture of beer, such filter presses are used to filter the spent grain from the mash, and it is the common practice to use manual labor to separate the frames and plates and shake the filter cloths to remove most of the accumulated spent grain and then hose down the filter cloths to remove that spent grain which does not come off when the filter cloth is shaken.

In a beer manufacturing operation, not only is this a time consuming operation and an operation requiring the use of two men to manipulate the heavy press frames and plates, but it is a very unpleasant task due to the splattering of the spent grain when the cloths are shaken and when hoses are used to hose down the cloths. In other types of manufacturing operations, particularly where the solids filtered out are corrosive or toxic, the cleaning operation can be hazardous as well.

It is an object of the present invention to provide an apparatus for automatically washing the filter cloths in a filter press.

It is a further object of the present invention to provide an apparatus which not only automatically washes the filter cloths in a filter press, but which also automatically opens the press, i.e. separates the plates and frames automatically, preparatory to the washing operation.

The apparatus comprises a gantry which is movable along the length of the filter press, and which carries a vertically reciprocable spray head with the necessary conduits attached thereto for feeding washing liquid to the spray head. The gantry also has thereon a fluid pressure operated mechanism for engaging the plates and frames and separating them successively from the stack of plates and frames and positioning them under the spray head preparatory to the vertical reciprocation of the spray head, and restacking them after they have been washed. The apparatus also includes the necessary driving means and control means for carrying out the operations in the proper sequence.

The invention will be described in greater detail in connection with the accompanying drawings which show a preferred embodiment thereof, and in which:

FIG. 7 is a perspective view taken from the other side of the press as seen in FIG. 1 and showing the power track.

Figure 1:
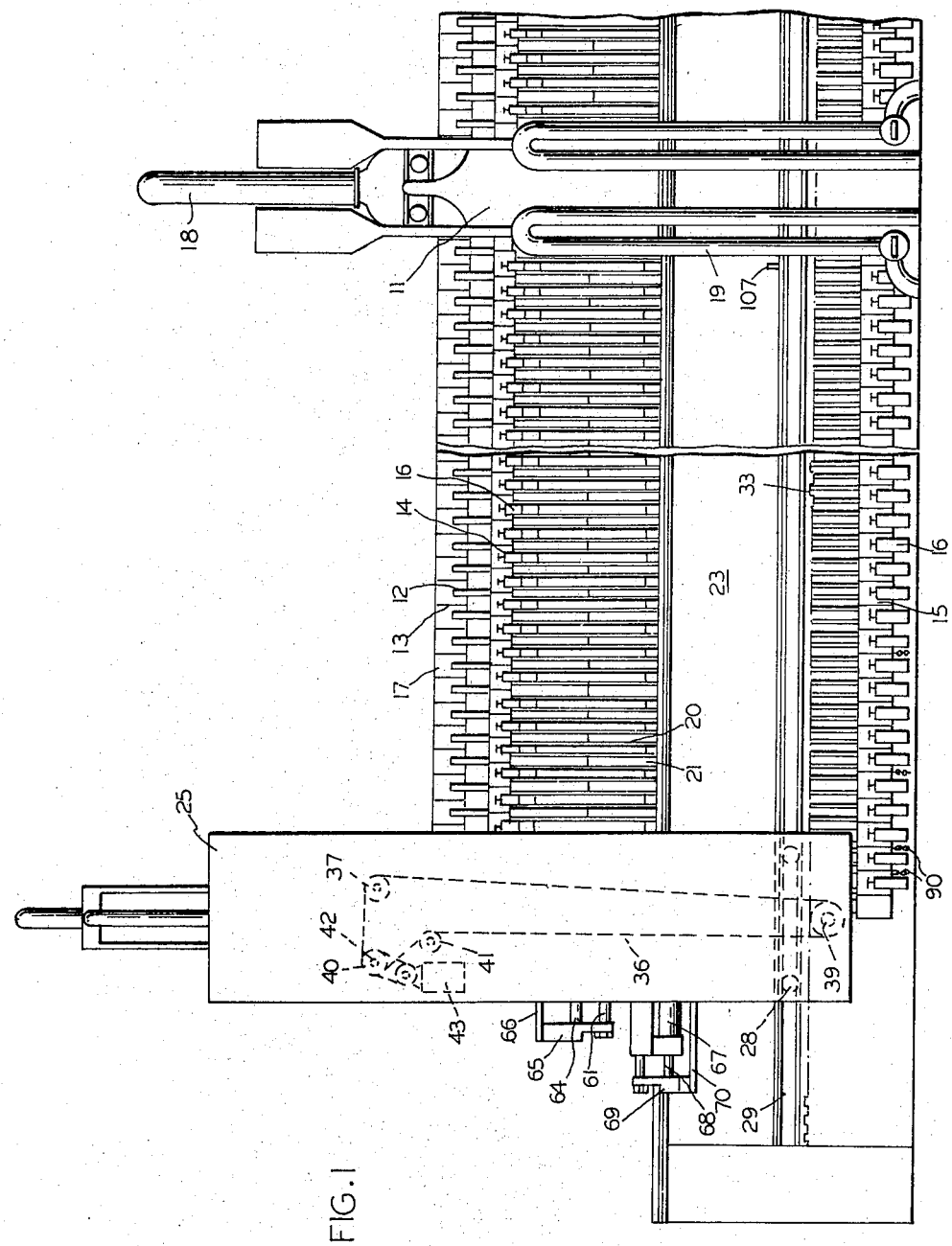
FIG. 1 is a side elevation view of a filter press having an automatic filter cleaning apparatus associated therewith.
Figure 2:
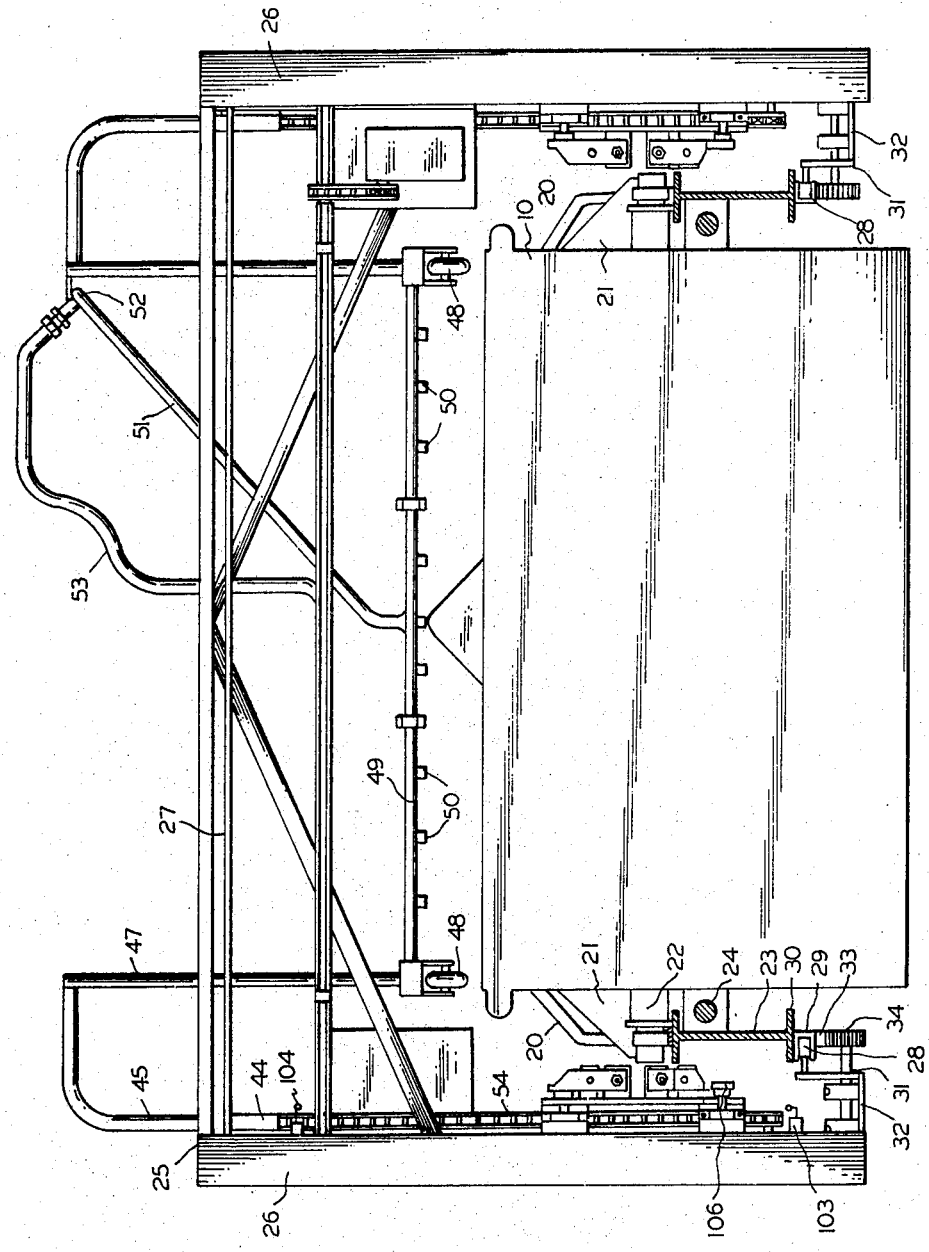
FIG. 2 is an elevation view taken transversely of the filter press and showing the gantry in front elevation.

Referring particularly to FIGS. 1 and 2, the filter press on which the washing apparatus of the present invention has been mounted comprises a header plate 10 and a fixed platen 11 at the center of the press and in between is a stack of plates 12 each two of which are separated by a frame 13. The plates 12 are rectangular frames with a corrugated or similarly contoured central portion adapted to support a filter cloth against collapse when fluid pressure is exerted from a frame 13 toward a plate 12. Each of the plates has an upper header section 14 and a lower header section 15 on the opposite sides thereof which mate with the upper and lower header sections on the other plates to form an upper plate header and a lower plate header along each side of the press. Stopcocks 16 are provide in each plate header section to enable the plates and plate headers to be drained at the end of a filtering run. The frames 13 each comprise a substantially rectangular frame member which has a contour matching that of the plates, and each has a frame header section 17 on the top thereof which mates with the header sections on the other frames to form a supply header running along the top of the press. Within the plates 12 and frames 13 are appropriate passages extending from the space within these members to the header sections, so that liquid fed into the supply header will flow into the frames 13 and filtered liquid will flow out of the plates 12 into the upper and lower plate headers. A supply pipe 18 is connected to one end of the supply header, and a drainage pipe 19 is connected to the ends of the plate headers.

A filter cloth is positioned between each frame and each plate, the filter cloths in the embodiment of the filter press shown in the drawings being double cloths which are folded over the top of each plate 12 and which extend downwardly on each side of the plate below the bottom of the plate. Appropriate gaskets are provided on the header sections and frames of the plates and frames where necessary to make the entire assembly substantially liquid tight.

Each of the plates 12 has a plate arm 20 extending laterally from each side thereof, and each of the frames 13 has a frame arm 21 extending laterally from the side thereof, the plate arms 20 in the embodiment shown having the ends thereof at a higher level than the ends of the frame arms 21. Each of the plates 12 and each of the frames 13 have a supporting projection 22 also projecting from each side thereof and slidably resting on one of two I-beam frame members 23 extending along each side of the filter press. Extending along the inside of each of the frame members 23 is a shaft 24 having the end thereof remote from the fixed platen 11 threaded through threaded holes in the header plate 10 and freely rotatable within holes in the plates and frames of the press. A motor (not shown) is geared to the ends of the shafts 24 at the fixed platen 11 for driving the shafts 24 in either rotational direction.

In the particular embodiment of the press as shown, there is an identical section on the other side of the fixed platen 11 which is fed from the same supply pipe 18 and the header plate of which is driven through shafts similar to the shafts 24 from the same motor as drives the shafts 24. In the following description of the washing apparatus, it should be understood that the washing apparatus is mounted so as to operate only on the left-hand end of the filter press described above.

In the normal operation of the filter press, with the press closed, i.e. the header plate pulled up tight against the stack of plates and frames by the rotation of the shafts 24, the mash or other solids containing liquid to be filtered is fed through the supply pipe 18 to the supply header formed by the frame header sections 17 and is distributed into the frames 13. The liquid flows through the filter cloths held over the plates between the plates and the frames, and the solids are retained on the filter cloth, while the liquid flows against the plate and through the appropriate passage into the upper and lower plate headers and out the drainage pipe 19. After the completion of a run, the stopcocks 16 on both the upper and lower plate header sections are opened to drain the liquid from the press, after which it is ready to be opened and the solids cleaned out.

The washing apparatus of the invention comprises a gantry generally designated 25 and having two upright side frame members 26 and a pair of parallel top frame members 27 connecting the tops of the side frame members. On an upturned flange 31 on the inner end of a gantry support plate 32 on the bottom of each of the side frame members 26 is a plurality of wheels 28 running on a track 29 on the top of the bottom flange 30 of the I-beam frame member 23 on the corresponding side of the press. A rack 33 is mounted along the bottom of the bottom flange 30 on each I-beam frame member, and meshing with the rack 33 is a gear wheel 34 rotatably mounted on the bottom of the gantry support plate 32. The gear wheels 34 are driven by a motor 43 mounted on the gantry for moving the gantry along the press. The drive is accomplished through chains 36, one in each upright side frame member 26 which run over sprocket wheels 37 at the top of the frames and corresponding sprocket wheels (not visible) on the gear wheel shafts 39 for the gear wheels 34, and are guided around drive sprocket wheels 40 by guide sprocket wheels 41. Drive sprocket wheels 40 are mounted on drive shaft 42 which is chain driven from a motor 43, preferably an electric motor.

Figure 3:
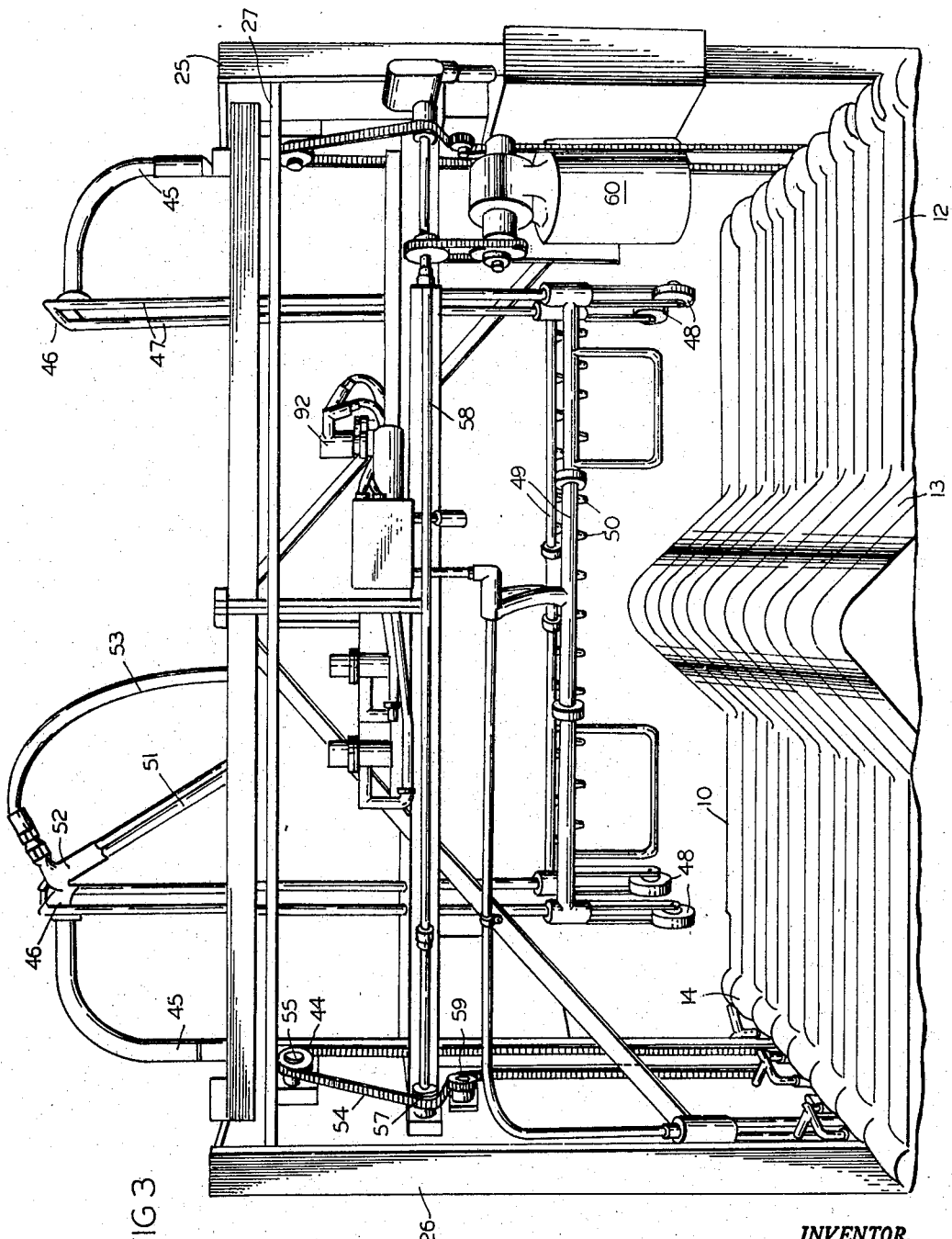
FIG. 3 is a perspective view similar to FIG. 2 showing the vertical side pieces of the gantry.

Mounted on the inside face of each upright frame member 26, as shown in FIG. 3, is a track 44 in which is slidably mounted a rectangular cross section portion of a spray head frame upright 45 which extends upwardly and then inwardly toward the corresponding spray head frame upright on the opposite gantry upright frame member. Mounted across the end of each spray head frame upright 45 is a transverse spray head frame member 46, from the ends of which is suspended a spray head. The spray head comprises parallel spray head suspension members 47 on the free lower ends of which can be mounted guide wheels 48. Extending between corresponding spray head suspension members 47 are spray headers 49 having a plurality of downwardly angled spray nozzles 50 spaced therealong and communicating with the interior of the spray headers 49. The nozzles are angled toward each other so as to throw sprays which if not interrupted would cross each other. Extending upwardly from about the center of each spray header 49 is a washing liquid supply pipe 51, these pipes extending parallel to each other and at an angle toward one of the transverse spray head frame members 46 where they are joined to a transverse washing liquid supply pipe 52. Connected to the transverse washing liquid supply pipe 52 is a flexible washing liquid supply hose 53 which extends to about the center of the gantry to a control valve 92 and then along one of the gantry frame members and down one of the side frame members 26 to a flexible supply pipe system to be described hereinafter. The entire spray head supporting system and washing liquid supply system is thus in two spaced parallel parts such that they can be lowered along a plate 12 while washing liquid is sprayed from the nozzle 50 without any of the parts except the guide wheels 48 touching the plate 12.

Spray head drive means are provided for driving said spray head in a vertical reciprocating movement. A spray head drive chain 54 is provided on the inside of each gantry side frame member 26 and is connected to a block on the rectangular cross section portion of the corresponding spray head frame upright 45. The drive chain 54 runs over upper and lower sprocket wheels (only upper sprocket wheel 55 being visible) which are mounted on the gantry side frame member 26 in positions such that one of the vertical runs of the drive chain runs along the track 44, so that movement of the chain 54 along that vertical run will raise or lower the spray head frame upright and thus the entire spray head frame. The chain 54 is guided over a drive sprocket 57 mounted on a drive sprocket shaft 58 by a guide sprocket wheel 59. The drive sprocket shaft is driven from a spray head frame driving motor 60 through a chain drive.

Figure 4:
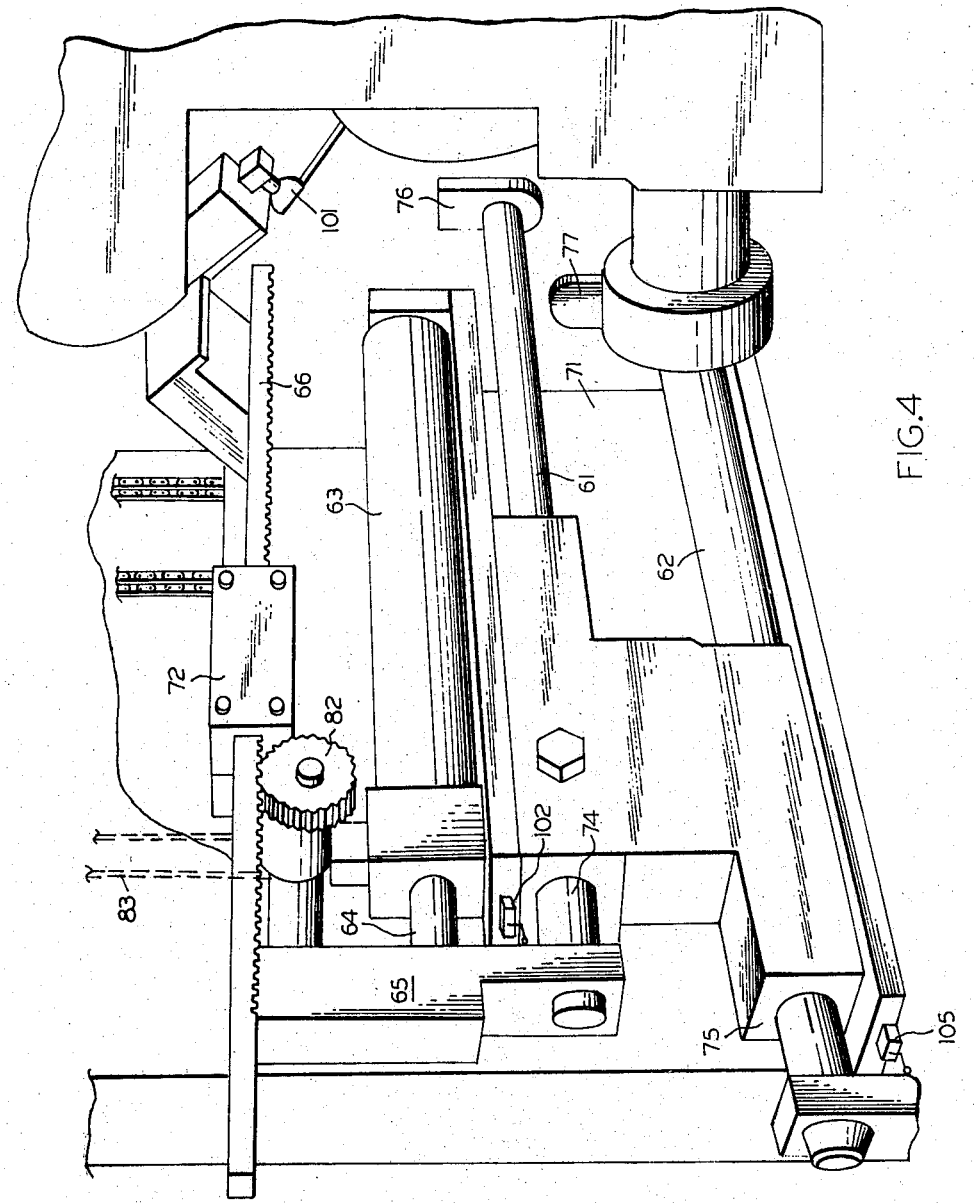
FIG. 4 is a perspective view, on an enlarged scale, of the inside of a part of one of the vertical side pieces of the gantry showing the pulling and stacking pistons and associated parts.
Figure 5:
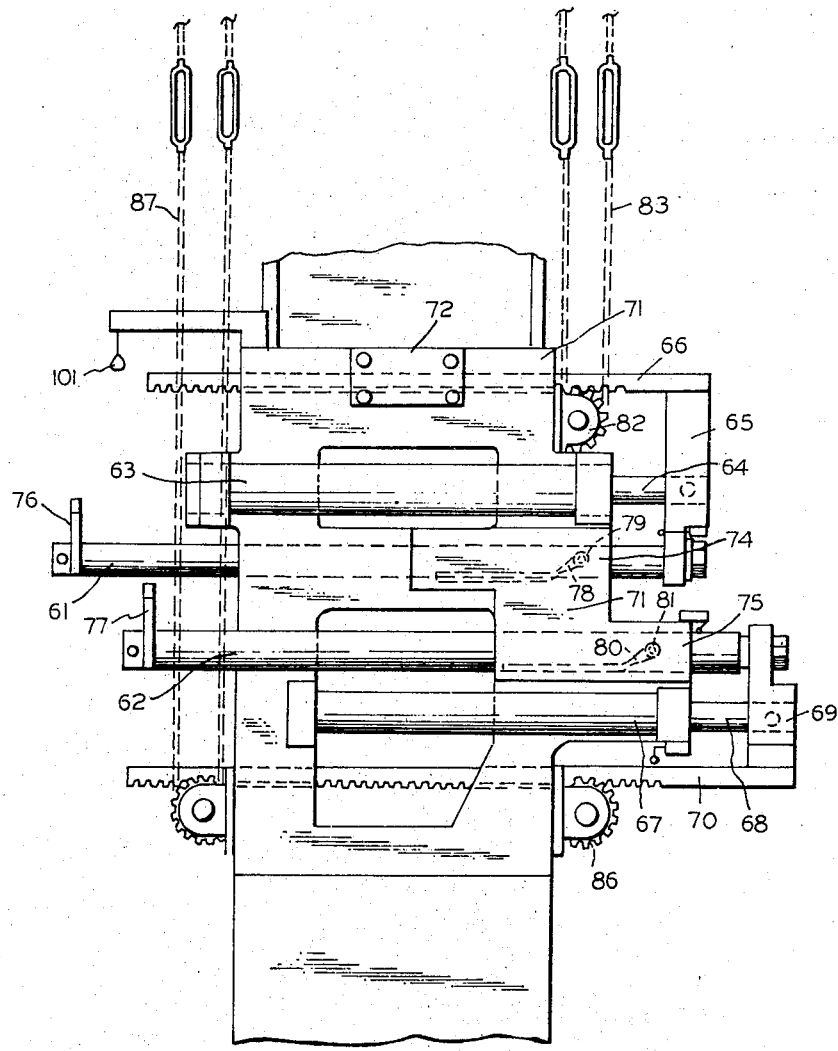
FIG. 5 is a side elevation view, partly broken away, of the parts shown in FIG. 4.
Figure 6:
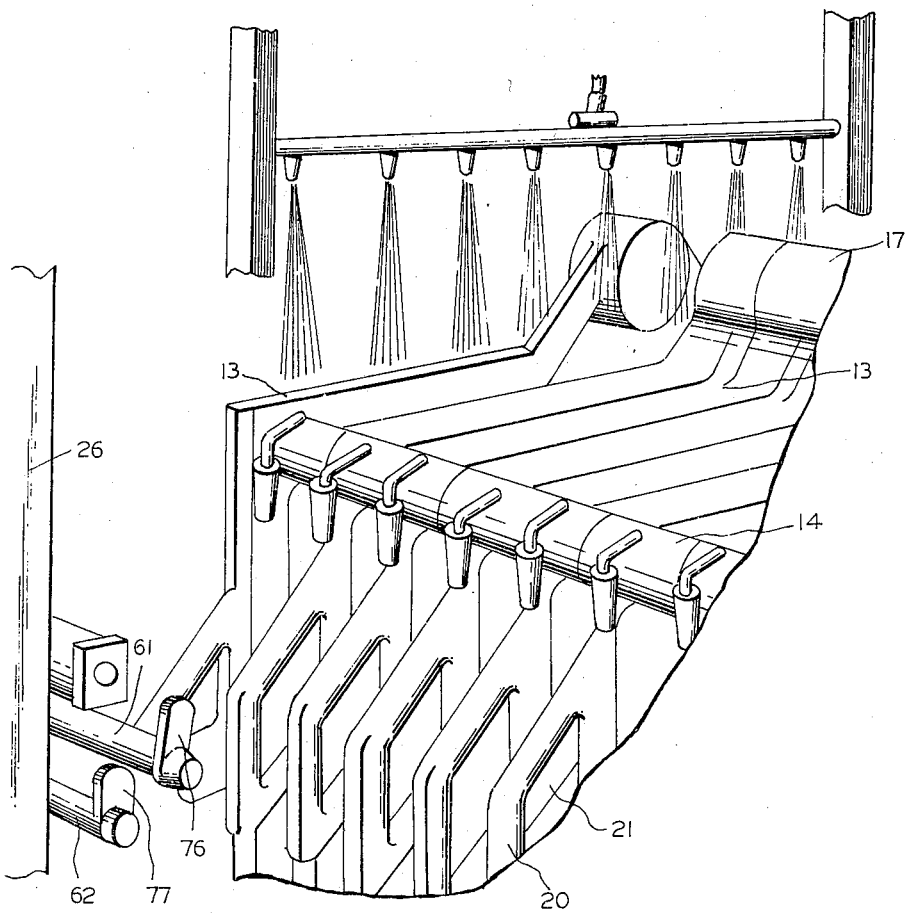
FIG. 6 is a perspective view of some of the parts shown in FIG. 3 and showing one of the filter plates in washing position.

Mounted on the inside of each of the gantry side frame members 26 is a reciprocating pull rod 61 and a reciprocating stacking rod (FIGS. 4 and 5). The pull rod 61 is mounted on the side frame member at a level adjacent the plate arms 20 and the stacking rod 62 is at a level adjacent the frame arms 21. Each of the rods is connected to a piston within a fluid pressure cylinder, the pull rod cylinder 63 being positioned above the pull rod 62 and having the piston rod 64 thereof connected to the pull rod 62 by a connecting frame 65. Positioned above the pull rod cylinder 63 is a synchronizing rack 66 which is also connected to the connecting frame 65. Corresponding parts are also provided for the stacking rod 62, the stacking rod cylinder 67 being positioned below the stacking rod 62 and having a piston rod 68 and a synchronizing rack 70 connected to the stacking rod 62 by a connecting frame 69. A mounting frame 71 is mounted on the inside face of the gantry side frame member 26 and has the pull rod cylinder 63 and the stacking rod cylinder 67 mounted thereon. Also mounted on the mounting frame 71 is a guide sleeve 72 guiding the pull rod synchronizing rack 66 and a guide sleeve (not shown) guiding the stacking rod synchronizing rack 70. A pull rod guide sleeve 74 is also mounted on the mounting frame 71 and in the present embodiment is integral with a stacking rod guide sleeve 75, which is also mounted on the mounting frame. Mounted on the end of the pull rod 61 is a pull rod pawl 76, and mounted on the end of the stacking rod 62 is a stacking rod pawl 77. In the pull rod 61 is a groove 78 which extends toward the pull rod pawl end of the pull rod and along the first part of its length spirals 90° along the surface of the rod and then runs along the length of the rod. A cam roller 79 on the inside surface of the sleeve bore is engaged in the groove 78 so that when the rod moves along the bore in one direction, it is turned through 90° in the first part of its movement and then remains in the turned position for the remainder of the movement in that direction, and on the return movement it moves in the turned position until the pin 79 reaches the spiral portion of the groove 78, at which time the rod is turned through 90° back to its initial position during the last portion of its movement. It will be seen that this turning movement of the pull rod 61 during its longitudinal movement will turn the pull rod pawl 76 from the initial vertical position shown in the drawings to a horizontal position during the first part of its movement, and will hold the pawl 76 in the turned position during the remainder of its movement in that direction, and on the return movement will only turn the pawl to its vertical position at the end of the movement. A similar groove 80 and cam roller 81 are provided for the stacking rod 62. Rotatably mounted on the mounting frame 71 is a pull rod synchronizing pinion 82 in mesh with the rack 66, and a synchronizing chain 83 extends from a sprocket wheel on pinion 82 around a sprocket wheel on a synchronizing shaft rotatably mounted across the top of the gantry (not visible in the figures). A similar synchronizing chain 83 is provided on the other side of the gantry to connect to the pinion meshed with the corresponding synchronizing rack on the other gantry side frame member. A similar pinion 86, synchronizing chain 87, sprocket wheel and shaft are provided for the pull rod synchronizing rack 70.

Connected between the bottoms of the first plate 12 and the first frame 13 are a pair of chains 90 which have a length such that when the chains are stretched taut the guide wheels 48 and one side of the spray head frame will be able to move downwardly between the plate 12 and frame 13. Similar sets of chains are provided between the second plate and second frame, third plate and third frame, etc.

After the press has been drained, as described above, the motor driving the shafts 24 is started, and the header plate 10 is moved away from the first plate 12 a predetermined distance, and that motor is stopped. The gantry driving motor 43 is then started and it drives the chains 36 at each gantry side frame member 26 so as to rotate the gear wheels 34 meshing with the racks 33 so as to drive the gantry along the I-beam frame members 23, until the gantry is in a position with the pull rod pawls 76 adjacent the plate arms 20 of the first plate 12. At this point the gantry driving motor 43 is stopped, and pressure fluid is supplied to the pull rod cylinders 63 to drive the pull rods 61 in a direction to pull the first frame away from the press. During the initial movement of the pull rods 61, the pawls 76 are turned inwardly and engage behind the plate arms 20 on the first plate. Further movement of the pull rods 61 separates the first plate 12 from the first frame 13 and moves it along the I-beam frames 23 to a position immediately beneath the spray header frame. At an intermediate point in this movement, the chains 90 become taut and the first frame 13 is caused to follow along in the movement of the plate 12 being moved until it is adjacent the stacking rod pawls 77. When the proper position of the plate 12 is reached, the pressure fluid supplied to the pull rod cylinders is reversed, and the pull rods are returned to their initial position, the pawls 76 turning outwardly and upwardly at the end of the movement of the rods 61. During this movement of the pull rods 61, the connecting frames 65 will move the synchronizing racks 66 and these racks, and hence the pull rods 61, will be kept together in their movement by the synchronizing chains 83, sprocket wheels 84 and shaft 85. This insures that the plate 12 is always kept perpendicular to the length of the I-beam frame members 23 and does not become cocked at an angle.

After the plate 12 is positioned beneath the spray head frame, valve 92 is opened and the spray head frame driving motor 60 is started, which in turn drives the chains 54 on each side of the gantry. The motor is first run in a direction to move the straight runs of the chains 54 in the downward direction, so that the spray head frame upright members 45 are moved along the tracks 44 in the downward direction to move the spray heads 49, the nozzles 50 of which are now spraying washing liquid due to the opening of the valve 92, downwardly along each side of the plate 12, which has the filter cloth on each side thereof. Solids on the filter cloth will thus be washed off by the action of the spray of washing liquid, and will fall out of the press. When the spray head frame reaches the lowermost position, the motor 60 is reversed and the spray head frame is raised to its initial position and the motor 60 is shut off. The valve 92 can be shut off at any time during the vertical reciprocal movement of the spray head frame, it being preferable to shut it off when the frame is in the lowermost position.

Pressure fluid is next supplied to the stacking rod cylinders 75 and the stacking rods 62 are driven in a direction to move the frame 13 toward the header plate 10. During the initial movement of the stacking rods 62, the pawls 77 are turned inwardly and engage behind the frame arms 21. Further movement of the stacking rods 62 moves the frame 13 along the I-beam frames 23 until it abuts the plate 12 which has just been washed, and the two members are moved further to a point which is out from beneath the spray header frame and adjacent the header plate 10. The stacking rods are then returned to their initial positions, the last part of the movement thereof causing the stacking rod pawls 77 to turn upwardly and outwardly to their initial positions. During this movement, the motion of the stacking rods has been synchronized by the synchronizing racks 70, pinions 86, synchronizing chains 87 and sprockets 88 on shaft 89, so that the frame 13 is not cocked out of its correct alignment.

The gantry driving motor 43 is again started to move the gantry until the pull rod pawls 76 are adjacent the plate arms 20 of the second plate 12. During this movement, the pawls 76 and 77 are out of the way of the plate arms 20 and the frame arms 21. At this point the cycle described above has started again. The cycle is repeated until all of the plates have been cleaned. At that time the gantry driving motor 43 is started in the reverse direction to drive the gantry back along the I-beam frame members 23 to its starting position, and the motor driving the shafts 24 is run in the opposite direction from the direction to open the press to move the header plate 10 back toward the central platen 11. This movement moves the stack of plates and frames until they are pressed against the central platen 11. The header plate is then pressed tightly against the stack of plates and frames to press them in sealing engagement with each other, and the shaft driving motor is then shut off. The press is then ready for another filtering operation.

While it is of course possible to turn the power supply switches and manipulate the valves etc. by hand, it is preferable to have the entire apparatus operate automatically. This is preferably accomplished by providing a plurality of limit switches which are interconnected so as to operate the apparatus to carry out the washing cycle set forth above. To this end there is provided a starting switch (not shown) for starting the gantry driving motor 43, and a feeler switch 101 (FIGS. 4 and 5) connected to the gantry motor circuit and to a circuit for actuating a pressure fluid solenoid (not shown), which feeler switch is positioned on the gantry frame to strike a plate arm 20 and open the gantry motor circuit and actuate the pressure fluid solenoids to supply pressure fluid to the pull rod cylinders 63 to move the pull rods 61. The solenoid valves are a type which automatically reverse when the pull rod pistons reach the limit of their movement in one direction, and limit switches 102 (FIG. 4) are provided to signal the end of the return movement to the solenoid and to deenergize it to shut off the supply of pressure fluid to the pull rod cylinders 63. The limit switches 102 are also connected to the power supply circuit for the spray header frame driving mootr 60, and this motor is energized to drive the spray header frame. Adjacent the bottom of one of the tracks 44 is a limit switch 103 (FIG. 2) which is connected to the power supply circuit for the motor 60 to reverse the motor 60, and adjacent the top of one track 44 is a limit switch 104 connected to the power supply for the motor 60 to deenergize the motor driving circuit. These limit switches are tripped by the block on the spray head frame upright 45. The limit switches 102 for the pull rods also energizes the solenoid valve 92 for the washing liquid, and either the limit switch 103 or the limit switch 104 can be connected to deenergize the valve 92, depending on when it is desired to shut off the washing liquid. The limit switch 104 is also connected to the solenoid valve (not shown) for supplying pressure fluid to the stacking rod cylinder. Limit switch 105 is positioned to be actuated by the return of the stacking rod to its initial position, and is connected to the gantry driving motor 43 for again starting this motor.

A further feeler switch 106 (FIG. 2) is positioned on the top gantry frame and is adapted to strike an end position stop 107 at the end of one of the I-beam frames 23, and the switch 106 is connected to the gantry frame drive motor 43 to reverse this motor. A further limit switch (not shown) is provided at the end of the I-beam frames 23 to shut off the entire control circuit when the gantry frame strikes it after it has returned to its starting position.

Because the driving motors, valves, and other controls are carried on the gantry, it is necessary to supply electric power, pressure fluid and washing liquid to the gantry. This is accomplished by the power track assembly shown in FIG. 7, which comprises a sprocket type chain made up of a series of link members 110 connected by plates 111 pivoted thereto. Extending between the side pieces of the link members 110 are transverse conduit holding pieces 112 having apertures therein through which extend conduits for electric power cables, high pressure fluid, and washing liquid, respectively. One end of the chain is attached to the bottom of the gantry and the other end is attached to the floor adjacent the center of the press. As the gantry moves along the press, the chain follows, rolling up into the form shown in the figure. Thus the conduits for the services to the gantry are kept aligned and are protected from damage by the equipment in the vicinity, such as the press itself, and any auxiliary equipment.

It will be appreciated that the various parts and arrangements thereof can be varied without departing from the spirit and scope of the invention as set forth in the appended claims. For example, it is not necessary to position the limit switches in the exact positions shown. They can be positioned in any convenient position where they will do the job for which they are intended. The exact arrangement of the pull and stacking rods and the corresponding cylinders and synchronizing racks need not be used, although this arrangement has been found to occupy but a small space for the travel of the rods. Other arrangements for suspending the spray headers can be used as long as they are spaced from each other just slightly greater than the thickness dimension of the plates and have an unobstructed space between them to permit their lowering and raising along the faces of the plate.

It will also be understood that the washing apparatus of the invention can be used on other types of filter presses than the one illustrated and described hereinbefore. All that is necessary is that there be some means such as the I-beam frame members 23 to move the plates and frames along, and that the plates and frames have some means thereon to enable the pull rod pawls and stacking rod pawls engage them.

The invention also contemplates the provision of the apparatus without the spray head frame, spray headers and associated parts. In such an embodiment the gantry with the pull rods and stacking rods and the actuating means, including the synchronizing means would be provided on the gantry for opening the plates from the press and stacking the frames and plates. Washing could be carried out manually with a hose or the like with the actions of the pull rods and stacking rods timed to allow for hosing down the filter cloths between actions of these rods. The limit switch for the pull rod would then simply be connected to the valve for the pressure fluid supply to the stacking rod cylinder through a delay means.

It is seen that there has been provided a washing apparatus for a filter press which automatically opens the press by separating the plates thereof one at a time from the stack of plates and frames, and then runs a spray header with nozzles spraying washing liquid therefrom down both sides of the plate to wash the filter cloth on opposite sides of the plate. The washing cycle is repeated for each plate and the washed plates and the frame following it are then stacked out of the way in preparation for the washing of the next plate. The operation can be made fully automatic, thus freeing the operators normally required for opening and cleaning the press for other work. The apparatus can be operated remotely thus making it unnecessary for the operator to subject himself to the inconvenience or even danger of being contacted by the solids washed from the filter cloths.

It is thought that the invention and its advantages will be understood from the foregoing description and it is apparent that various changes may be made in the form, construction and arrangement of the parts without sacrificing from the spirit and scope of the invention or sacrificing its material advantages, the form hereinbefore described and illustrated in the drawings being merely a preferred embodiment thereof.

What is claimed is:

1. An apparatus for washing a filter press having a plurality of filter plates and frames stacked in sequence with a filter cloth between each plate and frame and in which the plates and frames are movable along side frames so that they can be separated, said washing apparatus comprising a gantry movable along the filter press, gantry drive means coupled to said gantry for driving the gantry, a spray head frame mounted on said gantry for reciprocal movement transverse to the direction of length of the press and parallel to the plates of the press, said spray head frame having a spray head thereon with nozzles thereon directed transversely of the spray head, spray head frame driving means on said gantry and coupled to said spray head frame for driving said spray head frame, washing liquid supply means coupled to said spray head for supplying washing liquid to said nozzles, plate pulling means on said gantry engageable with the individual plates of said filter press for pulling said plates one at a time away from the stack of plates and frames and positioning the pulled plate under said spray head frame, plate and frame stacking means on said gantry engageable with the individual frames of said filter press for stacking the washed plate and the frame immediately following the washed plates in the stack in a position on the opposite side of the gantry from the stack of plates and frames, and actuating means coupled to said plate pulling means and said plate and frame stacking means for actuating them for pulling plates and stacking plates and frames.

2. A washing apparatus as claimed in claim 1 in which said gantry has wheels thereon resting on the side frames of the filter press, and said gantry drive means comprises a rack on said press, a pinion on said gantry meshed with said rack, and a gantry driving motor coupled to said pinion.

3. A washing apparatus as claimed in claim 1 in which said spray head comprises at least one spray header extending transversely of the filter press and having the nozzles spaced along the length thereof and angled outwardly and downwardly of the gantry frame, said spray head frame being mounted for vertical movement on said gantry.

4. A washing apparatus as claimed in claim 1 in which said spray head comprises two spaced spray headers extending transversely of the filter press, said headers being spaced a distance slightly greater than the thickness of a plate of the filter press, said headers having the nozzles spaced along the length thereof and angled toward each other and downwardly of the gantry frame, and said spray head frame having frame members thereon from which said spray headers are suspended which are spaced to leave an unobstructed vertical space between the spray headers, said spray head frame being mounted for vertical movement on said gantry.

5. A washing apparatus as claimed in claim 4 in which said spray head frame has upright members at either end thereof having substantially rectangular cross sections, a track on the inside of the gantry side frame member on each side of the gantry, said rectangular cross section upright members being slidable in said tracks, and said spray head frame driving means comprising a chain drive connected to said upright sepray head frame members and a sepray head frame driving motor connected to said chain drive.

6. A washing apparatus as claimed in claim 1 in which said plate pulling means comprises a pull rod on each gantry side frame member having a plate engaging member thereon and movable in the direction of the length of the filter press from a position in which the plate engaging member is adjacent a plate against the end of a stack of plates and frames to a position under the spray head frame.

7. A washing apparatus as claimed in claim 6 in which said plate engaging member is a pawl on the end of said pull rod extending laterally of said pull rod in only one direction, and said actuating means comprising rod moving means and means for turning said rod about 90° about its axis to move said pawl from an upright position to a position in which it is turned in toward the plates of the filter press.

8. A washing apparatus as claimed in claim 7 in which said rod moving means comprises a fluid pressure actuated means, and said means for turning said rod comprises a pull rod guide sleeve, a cam wheel on the inside of said sleeve, and said pull rod having a guide groove therein extending spirally around said pull rod for 90° and then extending along said rod.

9. A washing apparatus as claimed in claim 6 in which said pull rod actuating means further comprises synchronizing means coupled between the pull rod actuating means on one gantry side frame member and the pull rod actuating means on the other gantry side frame member.

10. A washing apparatus as claimed in claim 9 in which said synchronizing means comprise a rack on each pull rod actuating means, a pinion meshed with said rack, and a chain drive between the pinions on the opposite gantry side frames.

11. A washing apparatus as claimed in claim 1 in which said plate and frame stacking means comprises a stacking rod on each gantry side frame member having a frame engaging member thereon and movable in the direction of the length of the filter press from a position in which the frame engaging member is adjacent a frame adjacent the end of the stack of plates and frames to a position on the opposite side of the spray head frame from the end of the stack of plates and frames.

12. A washing apparatus as claimed in claim 11 in which said frame engaging member is a pawl on the end of said stacking rod extending laterally of said stacking rod in only one direction, and said actuating means comprises rod moving means and means for turning said rod about 90° about its axis to move said pawl from an upright position to a position in which it is turned in toward the plates of the filter press.

13. A washing apparatus as claimed in claim 12 in which said rod moving means comprises a fluid pressure actuated means, and said means for turning said rod comprises a stacking rod guide sleeve, a cam wheel on the inside of said sleeve, and said stacking rod having a guide groove therein extending spirally around said stacking rod for 90° and then extending along said rod.

14. A washing apparatus as claimed in claim 11 in which said stacking rod actuating means further comprises a synchronizing means coupled between the stacking rod actuating means on one gantry side frame member and the stacking rod actuating means on the other gantry side frame member.

15. A washing apparatus as claimed in claim 14 in which said synchronizing means comprises a rack on each stacking rod actuating means, a pinion meshed with said rack, and a chain drive between the pinions on the opposite gantry side frames.

16. An apparatus as claimed in claim 1 in which said gantry drive means, said spray head driving means, said washing liquid supply means, and said actuating means are interconnected for operating the parts of the apparatus in sequence for first separating a plate from the stack, reciprocating the spray head frame with the washing liquid spraying therefrom, then moving the washed plate and the next frame thereto out from under the spray head frame on the gantry, and then moving the gantry into position for the next cycle of operation.

References Cited

UNITED STATES PATENTS

| 924,131 | 6/1909 | Behrend | 210—230 X |
|---|---|---|---|
| 1,232,611 | 7/1917 | Saeger | 210—225 X |
| 2,682,676 | 7/1954 | Franchi | 134—172 X |
| 3,159,471 | 12/1964 | Revell | 134—172 X |
| 3,270,887 | 9/1966 | Juhasz et al. | 210—225 |
| 3,344,922 | 10/1967 | Kracklauer | 210—236 X |

FOREIGN PATENTS

| 1,003,954 | 9/1965 | Great Britain. |
|---|---|---|
| 6,516,120 | 6/1966 | Netherlands. |

REUBEN FRIEDMAN, Primary Examiner

C. M. DITLOW, Assistant Examiner

U.S. Cl. X.R.

210—230, 236; 134—144; 100—198